United States Patent
Lilly et al.

(10) Patent No.: US 7,145,472 B2
(45) Date of Patent: Dec. 5, 2006

(54) METHOD AND APPARATUS FOR HIGH SPEED DATA DUMPING AND COMMUNICATION FOR A DOWN HOLE TOOL

(75) Inventors: Dave Lilly, Houston, TX (US); Paul Cairns, Houston, TX (US); John Moore, Kingwood, TX (US); Ken Shorck, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 444 days.

(21) Appl. No.: 10/444,942

(22) Filed: May 23, 2003

(65) Prior Publication Data

US 2004/0039466 A1    Feb. 26, 2004

Related U.S. Application Data

(60) Provisional application No. 60/383,243, filed on May 24, 2002.

(51) Int. Cl.
   *G01V 3/00*    (2006.01)

(52) U.S. Cl. .............................. 340/853.3; 340/855.4; 367/81; 166/72

(58) Field of Classification Search ............. 340/853.3, 340/855.4; 367/81; 166/72
See application file for complete search history.

(56) References Cited

U.S. PATENT DOCUMENTS

| 4,718,011 A * | 1/1988 | Patterson, Jr. ................. 702/6 |
| 4,901,289 A | 2/1990 | Cretin et al. |
| 5,010,333 A | 4/1991 | Gardner et al. |
| 5,331,318 A | 7/1994 | Montgomery |
| 5,337,002 A | 8/1994 | Mercer |
| 5,442,750 A | 8/1995 | Harriman, Jr. et al. |
| 5,682,099 A | 10/1997 | Thompson et al. |
| 5,881,310 A | 3/1999 | Airhart et al. |
| 5,959,547 A * | 9/1999 | Tubel et al. ............. 340/853.2 |
| 6,041,378 A | 3/2000 | Warren |
| 6,205,087 B1 | 3/2001 | Fukuhara et al. |
| 6,348,876 B1 | 2/2002 | Wei et al. |
| 6,369,718 B1 | 4/2002 | Mathieu |
| 6,456,902 B1 | 9/2002 | Streetman |
| 6,519,568 B1 * | 2/2003 | Harvey et al. ................. 705/1 |
| 6,801,135 B1 * | 10/2004 | Schultz et al. ........... 340/853.1 |
| 6,843,332 B1 * | 1/2005 | Eppink et al. ................ 175/73 |

FOREIGN PATENT DOCUMENTS

| DE | 19513318 | 5/1996 |
| EP | 0398581 B1 | 5/1990 |
| GB | 2176375 A | 12/1986 |
| GB | 2309471 A | 7/1997 |
| JP | 63084334 A | 4/1988 |
| WO | WO 98/59464 A1 | 12/1998 |
| WO | WO 01/49001 A1 | 7/2001 |
| WO | WO 01/92686 A1 | 12/2001 |
| WO | WO 01/95517 A2 | 12/2001 |
| WO | WO 02/06716 A1 | 1/2002 |
| WO | WO 02/063341 A1 | 8/2002 |
| WO | WO 02/086712 A1 | 10/2002 |

* cited by examiner

*Primary Examiner*—Timothy Edwards, Jr.
(74) *Attorney, Agent, or Firm*—Madan, Mossman & Sriram P.C.

(57) ABSTRACT

The present invention provides a high-speed communication and data link between a downhole tool and a surface computer. The present invention provides a plurality of busses inside of the downhole tool for providing multiple data paths between a down hole tool memory or device and a surface computer. The present invention enables high-speed dumping of memory from the downhole tool to a surface computer. The invention also provides a web server inside of the downhole tool.

28 Claims, 5 Drawing Sheets

METHOD AND APPARATUS FOR HIGH SPEED DATA DUMPING AND COMMUNICATION FOR A DOWN HOLE TOOL

CROSS REFERENCE TO RELATED APPLICATIONS

This patent application claims priority from U.S. Provisional Patent Application Ser. No. 60/383,243 filed on May 24, 2002 entitled "A Method and Apparatus for High Speed Data Dumping and Communication for a Down Hole Tool," by Lilly et al.

BACKGROUND OF THE INVENTION

1. Field of the Invention

The present invention relates to communications in a measurement-while-drilling, logging-while-drilling, or wireline downhole tool and, in particular to the provision of mhigh-speed emory dumping and communications between a downhole tool and a surface computer.

Numerous tools are designed for downhole analysis of hydrocarbon-bearing formation from a wellbore drilled into the formation. These downhole tools are used in logging-while-drilling, monitoring-while-drilling, and wireline applications. An example of a downhole tool is as shown in U.S. Pat. No. 5,303,775. Petrophysical parameters regarding the formation are derived from measurements made by the downhole tool. Typically, the data acquired downhole is voluminous and it takes an inordinately long time to dump or transfer the data from the tool to a surface computer for analysis. Thus, there is a need for a method and apparatus that enables rapid transfer of data from the downhole tool to a surface computer. There is also a need for web server in the downhole tool to enable control of the tool and enhance diagnostics and analysis of the downhole tool data and operation horn a surface computer.

2. Summary of the Related Art

To obtain hydrocarbons such as oil and gas, a drilling assembly (also referred to as the "bottom hole assembly" or the "BHA") carrying a drill bit at its bottom end is conveyed into the well bore or borehole. The drilling assembly is usually conveyed into the well bore by a coiled-tubing or a drill pipe. In the case of the coiled-tubing, the drill bit is rotated by a drilling motor or "mud motor" which provides rotational force when a drilling fluid is pumped from the surface into the coiled-tubing. In the case of the drill pipe, it is rotated by a power source (usually an electric motor) at the surface, which rotates the drill pipe and thus the drill bit.

Bottom hole assemblies ("BHA") generally include several formation evaluation sensors for determining various parameters of the formation surrounding the BHA during the drilling of the well bore. Such sensors are usually referred to as the measurement-while-drilling ("MWD") sensors. Sensors are also deployed after the borehole drilling has been completed. Deploying a sensory device down hole via a wire line performs such operations.

Such sensors, whether MWD or wire line, have traditionally utilized electromagnetic propagation sensors for measuring the resistivity, dielectric constant, water saturation of the formation, and nuclear sensors for determining the porosity of the formation and acoustic sensors to determine the formation acoustic velocity and porosity. Other down hole sensors that have been used include sensors for determining the formation density and permeability. The bottom hole assemblies also include devices to determine the BHA inclination and azimuth, as well as pressure sensors, temperature sensors, gamma ray devices, and devices that aid in orienting the drill bit in a particular direction and to change the drilling direction. Acoustic and resistivity devices have been proposed for determining bed boundaries around and in some cases in front of the drill bit. NMR sensors as MWD sensors as well as wire line sensors can provide direct measurement for porosity, water saturation and indirect measurements for permeability and other formation parameters of interest.

To obtain hydrocarbons such as oil and gas, a drilling assembly (also referred to as the "bottom hole assembly" or the "BHA") carrying a drill bit at its bottom end is conveyed into the well bore or borehole. The drilling assembly is usually conveyed into the well bore by a coiled-tubing or a drill pipe. In the case of the coiled-tubing, the drill bit is rotated by a drilling motor or "mud motor" which provides rotational force when a drilling fluid is pumped from the surface into the coiled-tubing. In the case of the drill pipe, it is rotated by a power source (usually an electric motor) at the surface, which rotates the drill pipe and thus the drill bit.

Bottom hole assemblies ("BHA") generally include several formation evaluation sensors for determining various parameters of the formation surrounding the BHA during the drilling of the well bore. Such sensors are usually referred to as the measurement-while-drilling ("MWD") sensors. Sensors are also deployed after the borehole drilling has been completed. Depending a sensory device down hole via a wire line performs such operations.

Such sensors, whether MWD or wire line, have traditionally utilized electromagnetic propagation sensors for measuring the resistivity, dielectric constant, water saturation of the formation, and nuclear sensors for determining the porosity of the formation and acoustic sensors to determine the formation acoustic velocity and porosity. Other down hole sensors that have been used include sensors for determining the formation density and permeability. The bottom hole assemblies also include devices to determine the BHA inclination and azimuth, as well as pressure sensors, temperature sensors, gamma ray devices, and devices that aid in orienting the drill bit in a particular direction and to change the drilling direction. Acoustic and resistivity devices have been proposed for determining bed boundaries around and in some cases in front of the drill bit. NMR sensors as MWD sensors as well as wire line sensors can provide direct measurement for porosity, water saturation and indirect measurements for permeability and other formation parameters of interest.

Numerous tools are designed for downhole analysis of hydrocarbon bearing formation from a wellbore drilled into the formation. These down hole tools are used in logging while drilling, monitoring while drilling and wireline applications. An example of a downhole tool is is shown in U.S. Pat. No. 5,303,775. Petrophysical parameters regarding the formation are derived from measurements made by the down hole tool. Typically, the data acquired downhole is voluminous and takes an inordinately long time to dump or transfer the data from the tool to a surface computer for analysis. Thus, there is a need for a method and apparatus that enables rapid transfer of data from the downhole tool to a surface computer. There is also a need for web server in the downhole tool to enable control of the tool and enhance diagnostic and analysis of the downhole tool data and operation from a surface computer.

SUMMARY OF THE INVENTION

The present invention provides a high-speed parallel communication and data link between a measurement-while-drilling, logging-while-drilling, or wireline downhole tool and a surface computer or other device outside of the downhole tool. The present invention provides two or more parallel busses inside of the downhole tool for providing multiple data paths between a downhole memory or device and a surface computer. N sequential data bytes are sent over N different busses. The present invention enables high-speed dumping of memory from the downhole tool to a surface computer or other device outside of the downhole tool. The present invention also provides a data server and web sewer application inside of the processor located in the downhole tool. The web server alleviates software compatibility issues and provides access to the Internet. The data server is useful for monitoring data from devices inside the tool. The data server also monitors internal bus activity inside of the tool and enables display of this data on a personal computer.

DETAILED DESCRIPTION OF A PREFERRED EMBODIMENT

Figure 1:
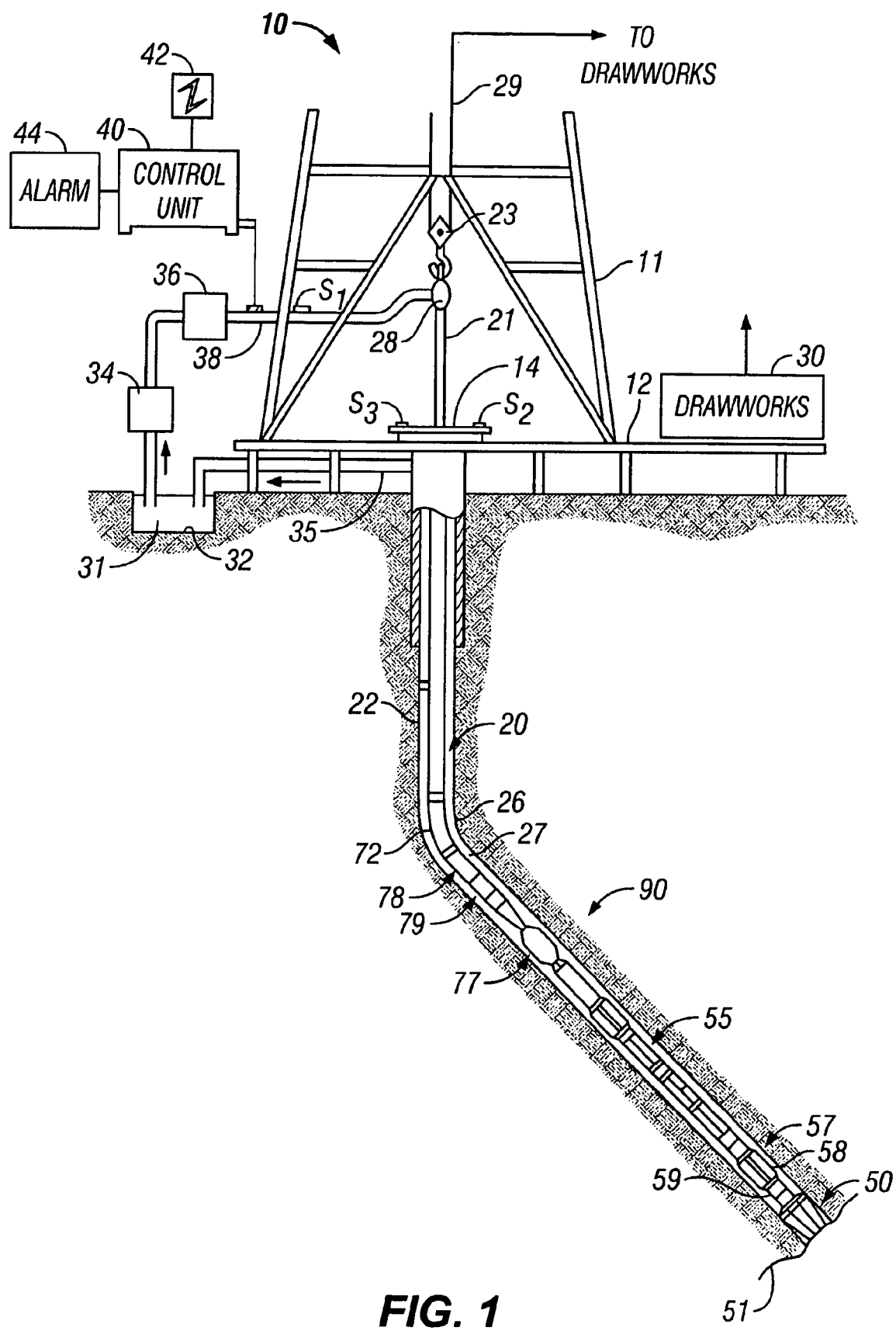
FIG. 1 is an illustration of a downhole tool deployed in a borehole.

FIG. 1 illustrates a schematic diagram of a drilling system 10 with a drill string 20 carrying a drilling assembly 90 (also referred to as the bottom hole assembly, or "BHA") conveyed in a "well bore" or "borehole" 26 for drilling the well bore. The present invention is applicable to down hole tools deployed on a wire line, coiled tubing or any other deployment system known in the art. The present example shows deployment on a drill string. The alternative deployment systems are not shown for simplicity, but are well known in the art. The drilling system 10 includes a conventional derrick 11 erected on a floor 12 which supports a rotary table 14 that is rotated by a prime mover, such as an electric motor (not shown), at a desired rotational speed. The drill string 20 includes tubing such as a drill pipe 22 or a coiled-tubing extending downward from the surface into the borehole 26. The drill string 20 is pushed into the well bore 26 when a drill pipe 22 is used as the tubing. For coiled-tubing applications, a tubing injector (not shown), is used to move the tubing from a source thereof, such as a reel (not shown), to the well bore 26. The drill bit 50 attached to the end of the drill string breaks up the geological formations when it is rotated to drill the borehole 26. If a drill pipe 22 is used, the drill string 20 is coupled to a draw works 30 via a Kelly joint 21, swivel 28 and line 29 through a pulley 23. During drilling operations, the draw works 30 is operated to control the weight on bit, which is an important parameter that affects the rate of penetration. The operation of the draw works is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the borehole bottom 51 through an opening in the drill bit 50. The drilling fluid 31 circulates up hole through the annular space 27 between the drill string 20 and the borehole 26 and returns to the mud pit 32 via a return line 35. The drilling fluid acts to lubricate the drill bit 50 and to carry borehole cuttings or chips away from the drill bit 50. A sensor S1 preferably placed in the line 38 provides information about the fluid flow rate. A surface torque sensor S2 and a sensor S3 associated with the drill string 20 respectively provide information about the torque and rotational speed of the drill string. Additionally, a sensor (not shown) associated with line 29 is used to provide the hook load of the drill string 20.

In one embodiment of the invention, the drill bit 50 is rotated by rotating the drill pipe 22. In another embodiment of the invention, a down hole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and a measurement while drilling (MWD) tool 79 are all connected in tandem with the drill string 20. Flex subs, for example, are used in connecting the MWD tool 79 in the drilling assembly 90. Such subs and tools form the bottom hole drilling assembly 90 between the drill string 20 and the drill bit 50. The MWD-tool 79 makes various measurements including the nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a down hole processor in the down hole tool, MWD-tool 79.

The surface control unit or processor 40 also receives signals from down hole sensors and devices via the communication sub 72 and signals from sensors S1-S3 and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur. FIG. 1 illustrates a schematic diagram of a drilling system 10 with a drill string 20 carrying a drilling assembly 90 (also referred to as the bottom hole assembly, or "BHA") conveyed in a "well bore" or "borehole" 26 for drilling the well bore. The drilling system 10 includes a conventional derrick 11 erected on a floor 12 which supports a rotary table 14 that is rotated by a prime mover, such as an electric motor (not shown), at a desired rotational speed. The drill string 20 includes tubing such as a drill pipe 22 or a coiled-tubing extending downward from the surface into the borehole 26. The drill string 20 is pushed into the well bore 26 when a drill pipe 22 is used as the tubing. For coiled-tubing applications, a tubing injector (not shown), is used to move the tubing from a source thereof, such as a reel (not shown), to the well bore 26. The drill bit 50 attached to the end of the drill string breaks up the geological formations when it is rotated to drill the borehole 26. If a drill pipe 22 is used, the drill string 20 is coupled to a draw works 30 via a Kelly joint 21, swivel 28 and line 29 through a pulley 23. During drilling operations, the draw works 30 is operated to control the weight on bit, which is an important parameter that affects the rate of penetration. The operation of the draw works is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the borehole bottom 51 through an opening in the drill bit 50. The drilling fluid 31 circulates up hole through the annular space 27 between the drill string 20 and the borehole 26 and returns to the mud pit 32 via a return line 35. The drilling fluid acts to lubricate the drill bit 50 and to carry borehole cuttings or chips away from the drill bit 50. A sensor S1 preferably placed in the line 38 provides information about the fluid flow rate. A surface torque sensor S2 and a sensor S3 associated with the drill string 20 respectively provide information about the torque and rotational speed of the drill string. Additionally, a sensor (not shown) associated with line 29 is used to provide the hook load of the drill string 20.

In one embodiment of the invention, the drill bit 50 is rotated by rotating the drill pipe 22. In another embodiment of the invention, a down hole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drill string 20. Flex subs, for example, are used in connecting the MWD tool 79 in the drilling assembly 90. Such subs and tools form the bottom hole drilling assembly 90 between the drill string 20 and the drill bit 50. The MWD-tool 79 makes various measurements including the nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a down hole processor in the MWD-tool 79.

The surface control unit or processor 40 also receives signals from down hole sensors and devices via the communication sub 72 and signals from sensors S1-S3 and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
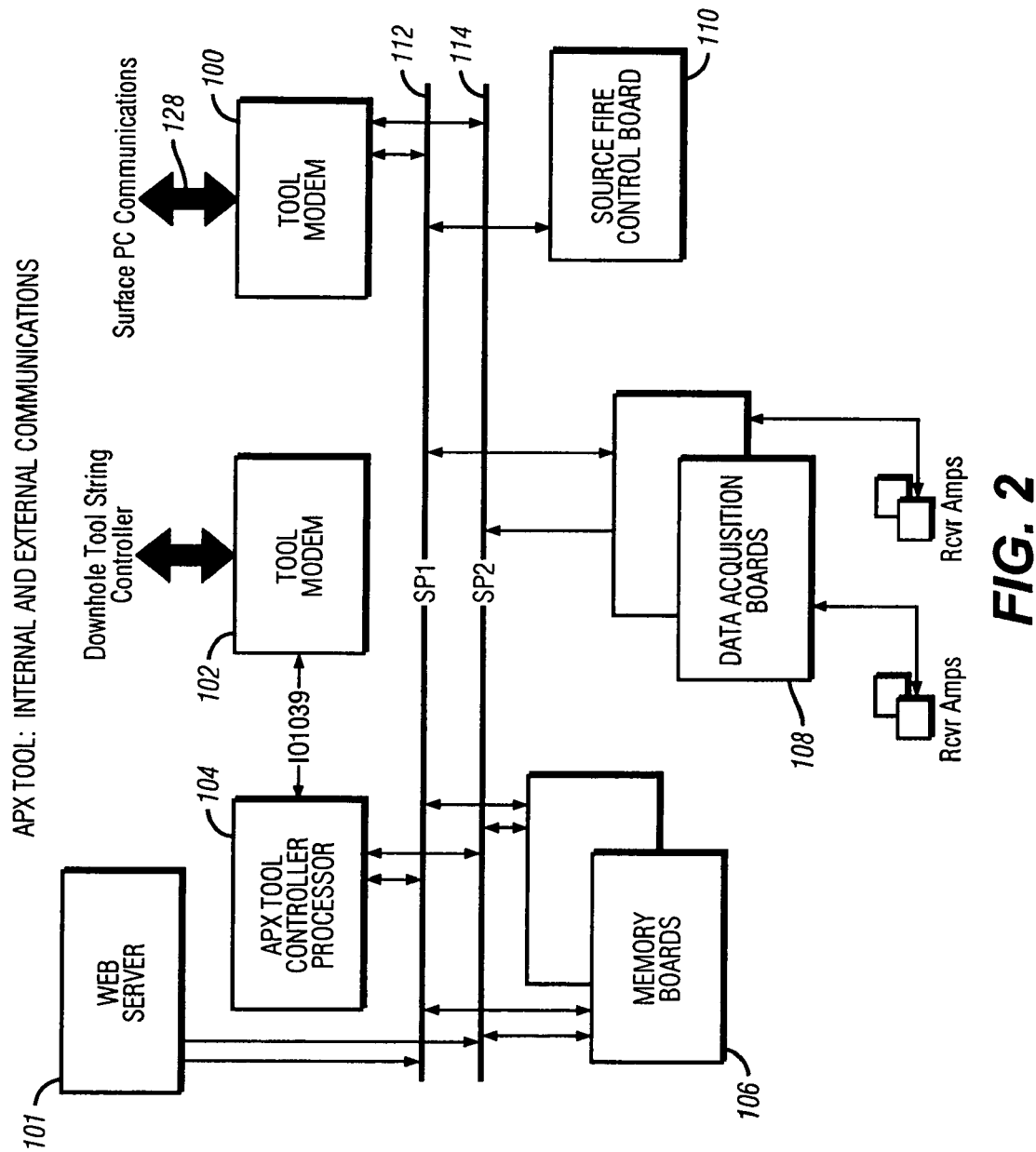
FIG. 2 is an illustration of a preferred embodiment of the present invention shown with a plurality of SPI busses.

Turning now to FIG. 2, The present invention provides a method and apparatus for using an Ethernet-SPI board (ESPI) 100 which provides a high speed communications interface 128 between a down hole tool, such as the Baker Hughes Inteq, Acoustic Properties Explorer (APX) Logging While Drilling (LWD) tool and a surface computer. The typical use of the present invention in provision of these communications enables an operator to initialize and determine internal status of the tool and to transfer contents of the large memories in the tool to the surface computer. In a preferred embodiment, the computer interface to the APX tool, and the ESPI board provided in a preferred embodiment, is based on the IEEE 802.3 Ethernet standard.

As shown in FIG. 2, an APX tool controller processor 104, memory boards 106, data acquisition boards 108, web server 101 and the Ethernet/SPI board (ESPI) 100 communicate on both SPI Buss 1 112 and SPI Bus 2 114. In an alternative embodiment, additional SPI busses up to N SPI busses are provided for communication between the APX tool controller processor 104, memory boards 106, data acquisition boards 108, web server 101 and the Ethernet/SPI board (ESPI) 100. The web server 101 is a software application that runs on the ESPI but is shown as a separate architectural block in FIG. 2. A downhole tool string controller communicates with the APX tool controller 104 through tool modem 102.

In a preferred embodiment, the preferred ESPI board 100 is also used outside the APX tool in the manufacturing, on-site surface production or drilling site and down hole environment as a general purpose Ethernet to SPI (synchronous peripheral interface) useful in enabling PC's to test other APX boards based on the SPI bus architecture.

In a preferred embodiment, the APX tool is specified to operate at temperatures up to 150 C. Therefore, all components of the tool, including the preferred ESPI board, preferably operate at or above 150 C. Even though the ESPI is used primarily at the surface after the APX has been brought out of the well where the tool is heated under the influence of down hole temperatures up to 150° C., the internal temperature of the tool may still be quite high. To operate at these high temperatures, DSP and other microprocessors are generally operated at lower frequencies than at room temperature. Specifically, all DSP's in the APX tool can be operated at half their normal operating frequency. The positive result is to increase reliability of operation. However, a negative result is that data processing speed and communications bandwidth between boards are reduced when reducing the normal operating frequency.

To effectively overcome these bandwidth limitations the preferred APX tool takes advantage of the parallel communication systems, provided by a plurality of SPI data communication busses provided by the present invention. The present invention provides a down hole tool, preferably the APX with two or more communication busses specifically for the purpose of ensuring a high communication bandwidth between data acquisition boards, data processing boards, memory boards and the ESPI. The effective bandwidth can be increased N times by the provision of N parallel communication busses.

When the APX tool is in operation down hole, data is collected at a substantial rate and stored in the tools internal memory. When the tool is brought to the surface, the contents of the tool memory are transferred to a surface computer. The transfer must be accomplished in a reasonable time frame due to the high cost of idle rig time. The quicker the job gets done the better. Anything over 20 minutes is generally considered unacceptable. The present invention is also applicable to speeding up data communications between the tool and any other device whether at the surface or downhole.

In the past, the time to transfer memory in downhole tools over a standard serial interface was at best 3500 bytes/second and usually not that fast. At a rate of 3500 bytes/second dumping a typical APX tool memory of 384 megabytes would take approximately 32 hours. In a preferred embodiment, using the 10 MHz Ethernet interface and a single access bus inside the APX tool, the standard memory takes 24 minutes to transfer. A 100 MHz Ethernet interface provided in an alternative embodiment of the present invention transfers the same data in 2.4 minutes.

Using the preferred ESPI board in conjunction with dual SPI busses in the APX tool enables memory transfers at a rate of 560,000 bytes/second or better depending the speed of the ESPI board and the number of parallel SPI busses provided. In a preferred embodiment, the 384-MB memory of the APX tool is transferred in 12 minutes. The ESPI board by using 2 parallel SPI busses to Ethernet conversion has effected a 160-fold improvement over the old serial data transfer rates during testing. This would not be possible without multiple parallel SPI busses routed into the ESPI interface and a high-speed path out of the ESPI to the external computer via Ethernet. In an alternative embodiment, additional SPI busses are added, up to N busses, so that more than N SPI busses can be used to speed up memory transfers by a factor of N. In another alternative embodiment, a 1 gigabyte memory and a 10/100 Ethernet board connection providing a 100 MHz transmission speed is provided.

In addition to the improvements that ESPI offers the APX tool in speed of "dumping" memory or communicating data to and from the down hole tool, a software application written for both the ESPI and a workstation interface for use at the surface to this board, enable a "responsive" client/server model to be implemented. A client is a surface or down hole computer that generally controls the requests for information. The server responds to those requests. In the APX tool the ESPI board of the present invention "serves" the client surface computer by responding to various commands such as returning a file directory in the tools memory, or firing the tools acoustic source. This type of system lends itself well to providing a user environment that "looks and feels" as if it were a common peripheral on a computer network, such as a network hard drive.

Figure 3:
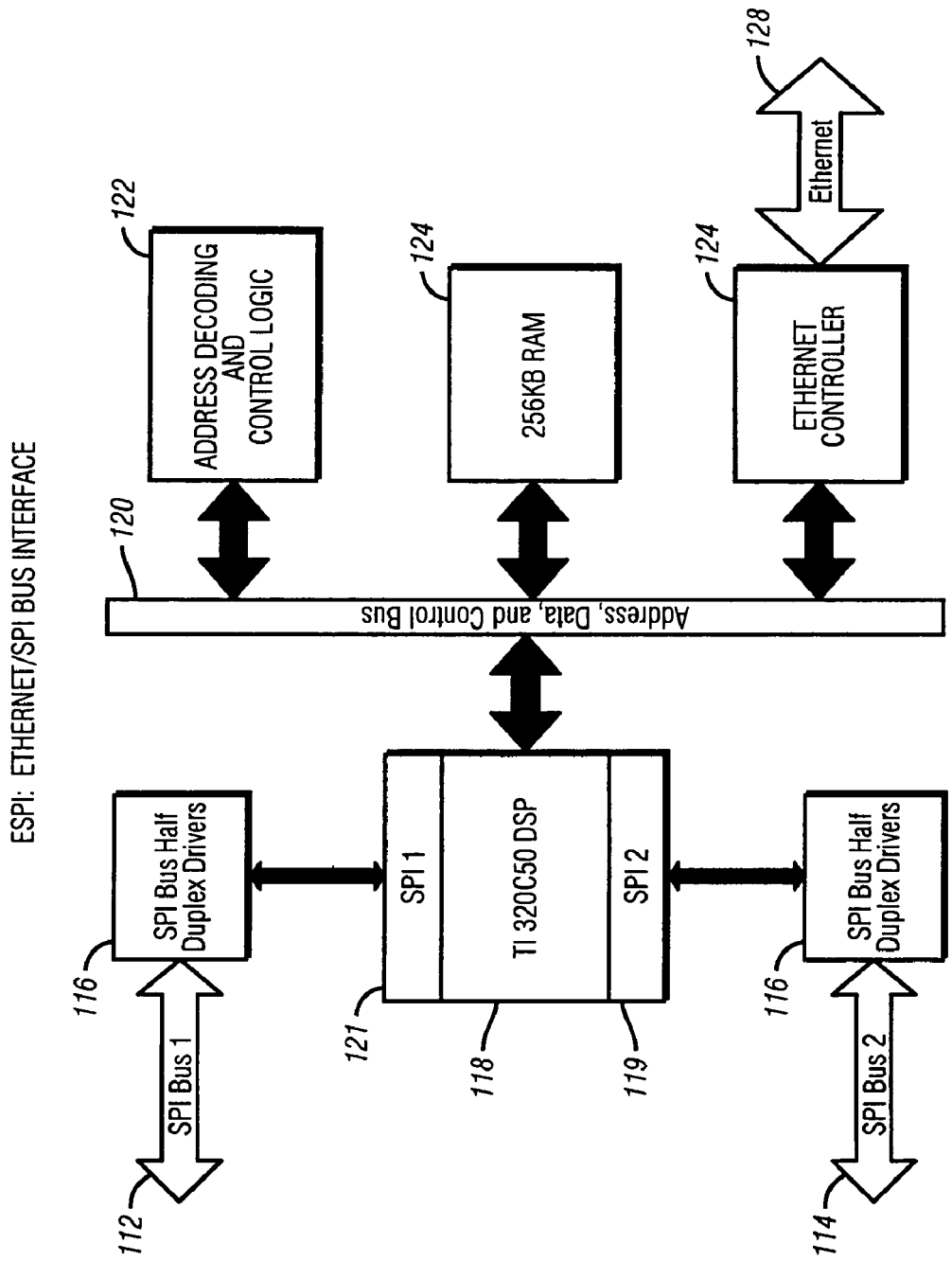
FIG. 3 is an illustration of a preferred embodiment of the preferred Ethernet/SPI bus interface.

As shown in FIG. 3, in a preferred embodiment, the main features of the present invention are an ESPI board, dual SPI bus interfaces 119 and 121, Digital Signal Processor (DSP) 118, and an Ethernet controller 126. Message packets can be moved on both SPI busses and the Ethernet simultaneously. The DSP system controller not only contains the two SPI bus interfaces but ensures highly efficient "data movement" between SPI busses and the Ethernet controller.

Turning now to FIG. 3, as can be seen in FIG. 3, the ESPI board preferably does not provide ROM or flash memory in which program code is permanently stored. To maximize the flexibility in programming APX boards and to reduce board component count the preferred ESPI board has 256 KB of RAM, which is used for both the application code and data. Application code is loaded serially into ESPI at power up via the SPI 1 interface. A feature of the TI C50 DSP 118 is that it allows for multiple boot methods, including serial boot via the SPI 1 interface. The application code for the ESPI board normally comes from the APX Tool Controller when power is applied. An alternate source of application firmware is the ESPI Boot Board. This is a separate board containing an EEPROM with the stored code and the necessary SPI interfaces to send code serially to the ESPI.

The TI C50 DSP provides two built-in SPI busses 112 and 114. On the ESPI board these two busses are interfaced to the outside world via differential drivers arranged for half duplex operation. With the C50 operating at 20 Mhz, the SPI busses can each transfer data at a maximum rate of 2.5 megabits per second. In a preferred embodiment, efficient assembly language code is provided to specifically handle the flow of data into and out of the C50 DSP via two or more SPI busses, simultaneously, and at the maximum data movement rates.

The Crystal CS8900 Ethernet LAN controller 126 is optimized for the Industry Standard Architecture (ISA) and provides high speed Ethernet capability for the ESPI board. This component consists of internal RAM buffers, an IEEE 802.3 MAC engine and 10BaseT receive and transmit filters. This component was designed for use in PC Ethernet cards but has been found to survive high temperatures which when combined with its small size makes it suitable for use in downhole tools. Alternate components have been found with similar functionality, size, and survivability characteristics.

Figure 4:
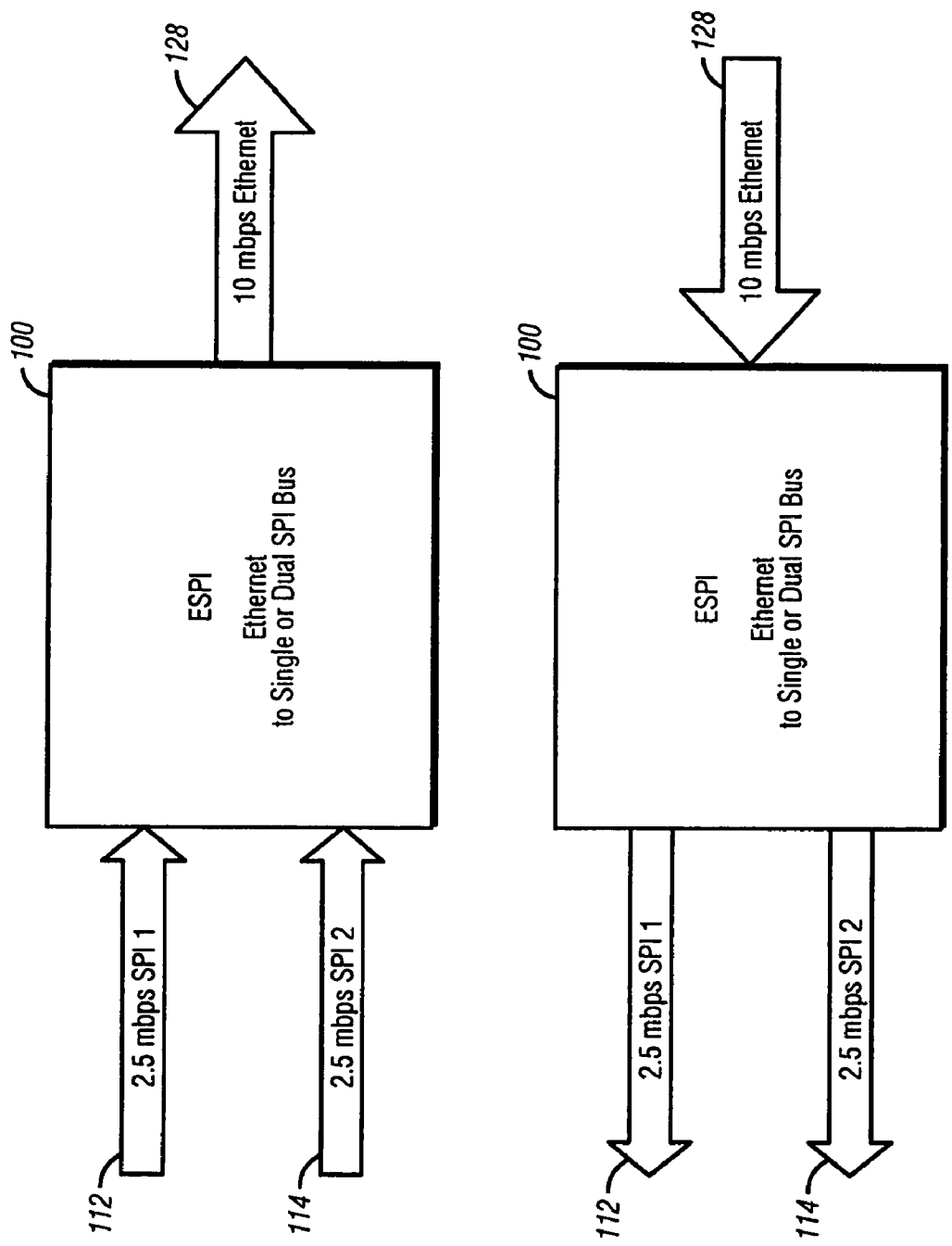
FIG. 4 is an illustration of a preferred embodiment of ESPI to Ethernet interface.

Turning now to FIG. 4, in operation ESPI 100 moves data from the Ethernet 128 to the SPI bus 112 and 114 or vice versa as shown in FIG. 4. Data is provided to the Ethernet by a surface computer, workstation, or other device external to the downhole tool. The ESPI software causes data to be moved from various devices attached to the SPI busses in different ways. For most devices, such as the data acquisition boards, communication takes place across a single SPI bus at a time, either SPI 1 or SPI 2. However, messages can be sent or received on both SPI busses or N SPI busses simultaneously.

Figure 5:
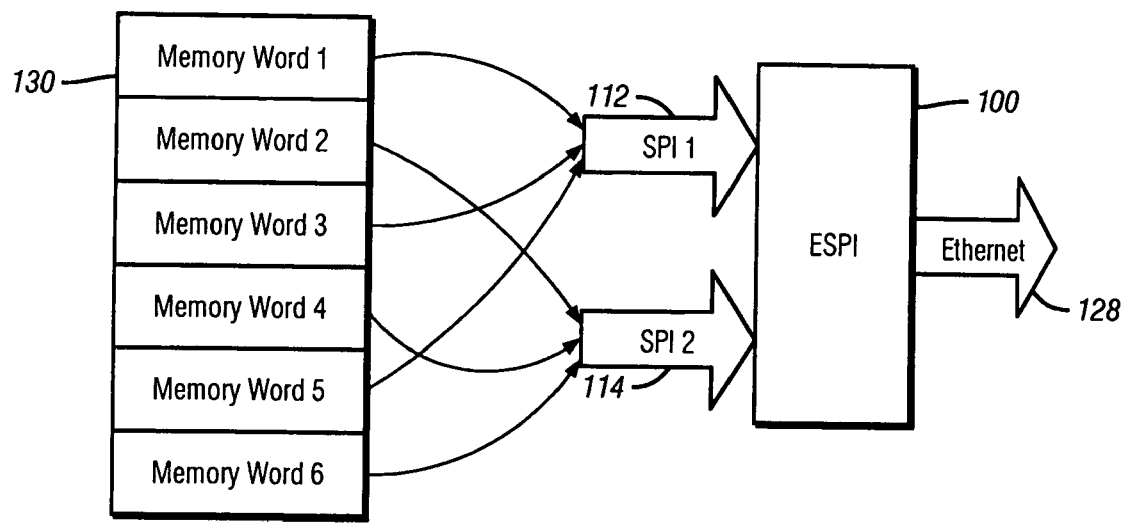
FIG. 5 is an illustration of a preferred memory dumping over a plurality of SPI busses.

When receiving data from a memory board, which has connections to a plurality of SPI busses (2-N) as shown in FIG. 2, the most efficient way to move data from that device to the Ethernet is to have every other memory word sent on separate SPI busses. Hence, memory word 1 would be sent on SPI bus 1, memory word 2 on SPI bus 2, memory word 3 on SPI bus 1, and so on. As diagrammed in FIG. 5, this alternating placement of memory words on the two SPI busses effectively doubles the rate of communications to the ESPI that would otherwise be available from one memory storage board. In an alternative embodiment, N SPI busses are provided so that a transfer from a memory board or other device is sped up by a factor of N times. Hence, memory word 1 would be sent on SPI bus 1, memory word 2 on SPI bus 2, memory word 3 on SPI bus 3, memory word N on SPI bus N, and memory word N+1 on SPI bus 1, and so on.

In a preferred embodiment, to accommodate the dual nature of the ESPI communications, the ESPI software provides two different types of software protocols: one internal tool protocol for the SPI buses and another for the Ethernet communications between the tool and devices outside of the tool.

The software protocol for the SPI buses comprises words in messages comprising two bytes (16 bits). A message packet consists of a "To-From" address, the negated value of that address or "NOT To-From", a command word, the length of data to follow, any data words, and a 16 bit checksum. This is a simple protocol that is very efficient and allows a throughput close to the theoretical maximum, e.g., 2.5 MBPS per SPI bus.

Ethernet protocols can be very complex. In the case of the ESPI protocol suite, the protocol is a well-documented subset of the TCP/IP protocol suite called User Datagram Protocol (UDP). In addition to this protocol are several protocols utilized to establish communications between computers. These are the address resolution protocol (ARP), which provides the "true" address of the ESPI hardware to the communicating computer, and Internet control message protocol (ICMP), which provides a "ping" echo function to determine if the ESPI is present.

With the implementation of UDP sockets on ESPI any modern computer system equipped with an Ethernet card and an operating system can be used to communicate with this board. Windows NT and virtually every operating system offer library routines for opening "sockets" of the UDP type. This basically enables a programmer to open a book on sockets programming and type in "how to" examples. Using UDP offers the fastest communications standard in which to dump the tool, perform calibrations, diagnostics, tool programming, etc.

Even though the UDP protocol is fast, there is still more overhead associated with this protocol than with the SPINET protocol provided by the present invention. While the raw throughput of the two SPI busses is 5 megabits per second and the raw output of the 10BaseT Ethernet is 10 megabits per second, the real flow of data into the ESPI nearly matches the possible flow allowed by the Ethernet interface. This near match is due to the efficiency of the SPINET protocol and the overhead in the UDP protocol. In an alternative embodiment, using a 10/100 100 MHz Ethernet connection the present invention enable communication at 100 MHz.

The ESPI interface is an innovative component providing high-speed real time communications between tools using internal SPI busses and computers with Ethernet cards. The speed of communications approaches the maximum efficiency of the 10 MBPS Ethernet allowing much larger memories to be "dumped" from tools than considered reasonable before its development. The present invention enables software to be written for surface computers, using standard socket interfaces, providing real time tool diagnostics and evaluation of an unprecedented nature in the oil service industry. Users can now interface with a tool much as they would many other devices attached to a workstation communicating with a tool via the present invention.

UDP is an unreliable communication protocol, where messages are not guaranteed delivery like TCP. Messages are simply sent or received. This simplifies transmission of packets through the network and improved throughput. UDP is fast since very little of processing of the messages are performed.

In a preferred embodiment, UDP checksums are set to zero to alleviate the processing burden on the requesting and transmitting processors in calculating these checksums. The checksum is performed on all the UDP data plus a portion of the IP data, this processing consume considerable overhead in time when generating messages. The hardware checksum that the Ethernet controller automatically adds at the end of a packet is relied upon for accurate transmission and reception.

A communication bus protocol is provided and rides on top of the UDP layer utilizing existing code and drivers. This protocol also provides a communication/transmission mode whereby a single request is answered by multiple packets. This technique reduces the request/response overhead and allows the slave enity to run as fast as possible. The transfer of multiple packets reduces overhead and improves throughput. Any missed packets are requested again after all the bulk of the data has been transmitted.

The steps to achieve this transmission mode are as follows: The surface computer, PC or other device external to the tool issues a command to read an entire file. The tool acknowledges this command and replies with a packet that contains an echo of the file information requested plus the start of the actual file data. All this is contained in the largest packet size that the slave node can provide. Now the host PC is aware of how many packets will be required and how large they will be. The slave nodes send the first packet back to the host PC, at the end the slave node waits a delay of a few milliseconds to ensure that packets have been reliably retrieved at the external device. While this is in progress, the slave starts collecting data that will be used for the next packet, when the time out time has expired it then sends the next packet to the PC. This step is repeated until all the data has been transferred. The last frame from the slave contains a special acknowledge code that informs the external device that the transmission mode is complete. Both PC/external device and slave now revert to normal bus operation with single request/responses. The PC/external device keeps track of any packets it missed and makes normal requests to collect this data. This may not be required if a complete transfer took place without errors.

Figure 6:
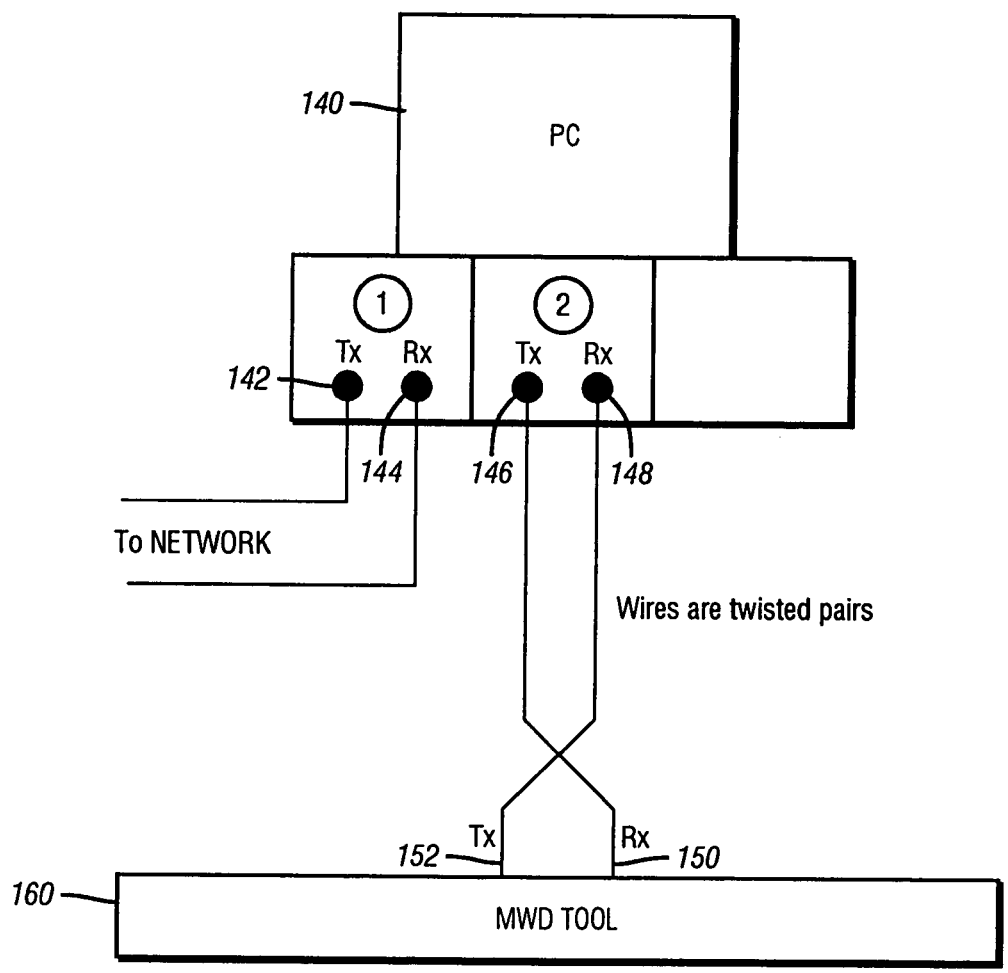
FIG. 6 is an illustration of a preferred topology for the present invention.

Ethernet communication is a priority less communication method. Messages are broadcast and can collide with other messages from other nodes connected to the Ethernet. When a sending unit detects a collision, then the sending unit senses this and backs off transmission, then resends the messages later until the messages get through. To eliminate collision and the transmission delay caused by resending after a collision, the preferred invention improves on this topology. In a preferred embodiment, the network consists of two nodes, the host PC and the MWD or wire line tool. The Adam bus protocol is a request/response arrangement so that at any given time there is only one messages on the bus, and so the possibility of message collision is almost non-existent, again this is improves throughput. Another advantage of this network topology is that a hub or router can be omitted. As shown in FIG. 6, the transmit port 146 on the PC is connected to the receive port 150 on the Tool, and the receive port 148 on the PC is connected to the transmit port 152 on the Tool. This allows for less hardware and less complexity.

Elevated temperatures for downhole operation were not a considered to be a significant factor. There was an initial concern that when the tool was removed from the hole it would be at an elevated temperature, to overcome this is issue the bus transformers were wound on special cores and the circuits were tested at up to 200 Deg C.

In a preferred embodiment, as shown in FIG. 2, an Embedded http Web Server 101 resident in the ESPI board enables all software to reside in the tool with only browser required on the host PC, this architecture solves software compatibility issues. Allow remote access in difficult locations, and remote troubleshooting. Links to other web sites for tracking purposes, maintenance and for tool documentation can implemented. The ability to download latest versions of its own firmware from a remote web site also exists, less human intervention and forced upgrades.

In a preferred embodiment, an email server resident in the ESPI board is provided in the tool to support the transmission or reception of e-mails. Diagnostic triggers can be implemented to e-mail central group if problems detected. Also technical alerts can be added so that only tools with a particular build will receive the e-mail when attached to the network. This improves over human error since it is now manually done.

A downhole MWD/LWD or wire line Ethernet modem is provided by the present invention. A downhole MWD/LWD Ethernet modem is supported by the current fleet down hole tools, since the mechanical connection already exists on the tools, only the modem boards need to be replaced. Chips are available for Ethernet that modulate on to co-axial cable, so a modem in theory could also be done. This topology would allow memory to be distributed or centralized or both. Memory dumping can be done with all the nodes and it would allow an easy integration to our current system.

In another embodiment, the method of the present invention is implemented as a set computer executable of instructions on a computer readable medium, comprising ROM, RAM, CD ROM, Flash or any other computer readable medium, now known or unknown that when executed cause a computer to implement the method of the present invention.

While the foregoing disclosure is directed to the preferred embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

The invention claimed is:

1. An apparatus for communication between a downhole tool and a surface computer comprising;
    a downhole tool for traversing a well bore in a formation;
    a processor associated with the downhole tool and disposed within the downhole tool for controlling communications over a communications link between the downhole tool and an a external device external to the downhole tool;
    at least one internal device associated with the downhole tool; and
    a plurality of parallel data busses associated with the downhole tool for transferring data between the processor and the at least one internal device associated wit the downhole tool.

2. The apparatus of claim 1, further comprising:
    a communication protocol for transmission of data between the processor and the at least one internal device.

3. The apparatus of claim 2, wherein the communication protocol further comprises an application for transmitting successive bytes of data between the processor and the at least one internal device over different busses.

4. The apparatus of claim 1, further comprising:
    a web server associated with the processor.

5. The apparatus of claim 1, further comprising:
    a responsive client/server model, wherein a Client outside of the downhole tool requests an action by the downhole tool.

6. The apparatus of claim 1, further comprising:
    a monitor function in the processor for monitoring activity on at least one bus; and
    a display for displaying the monitored activity.

7. The apparatus of claim 1, wherein the processor is an Ethernet controller.

8. The apparatus of claim 7, further comprising:
    an external device Ethernet transmit port and receive port;
    an internal device Ethernet transmit port and receive port;
    a direct connection between the external device Ethernet transmit port and the internal device Ethernet receiver port; and
    a direct connection between the internal device Ethernet transmit port and the external device Ethernet receiver port so that a router is not necessary for communication between the at least one internal device and the external device.

9. The apparatus of claim 2, wherein the communication protocol sends only one message at a time substantially eliminating collisions.

10. The apparatus of claim 3, wherein N bytes are transmitted between the processor and the at least one internal device over N different busses.

11. The apparatus of claim 7, wherein the communication protocol checksums for the external device and at least one internal device are set to zero to alleviate the burden of calculating the checksums on the at least one internal device, wherein a checksum is added at the end of a packet by the processor.

12. The apparatus of claim 4, wherein the web server provides all software resident in the downhole tool and a browser provides an interface to the downhole tool and alleviates software compatibility issues.

13. The apparatus of claim 1, further comprising an e-mail server in the processor for transmission and reception of e-mails.

14. The apparatus of claim 13, further comprising:
at least one technical e-mail alert addressed so that only downhole tools with a particular address will receive the at least one technical e-mail alert when attached to a network.

15. A method for communication between a downhole tool and a surface computer, the method comprising:
traversing a well bore in a formation wit a downhole tool;
controlling communications over a communications link between the downhole tool and an external device outside of the downhole tool with a processor associated with the downhole tool and disposed within the downhole tool; and
transferring the data between the processor and at least one internal device associated with the downhole tool over a plurality of busses associated with the downhole tool.

16. The method of claim 15, further comprising:
transmitting the data in accordance with a communication protocol for transmission of data between the external device and the at least one internal device.

17. The method of claim 16, further comprising:
transmitting successive bytes of data from the at least one internal device to the processor over different busses.

18. The method of claim 15, further comprising:
providing access to the Internet via a web server associated with the processor.

19. The method of claim 15, further comprising:
requesting from a client outside of the downhole tool an action by the downhole tool in a responsive client/server model.

20. The method of claim 15, further comprising:
monitoring activity on a bus via a monitor function in the processor; and
displaying the monitored activity.

21. The method of claim 15, further comprising:
supporting Ethernet communications.

22. The method of claim 21, further comprising:
connecting an external device Ethernet transmit port and an internal device Ethernet receiver port; and
connecting an internal device Ethernet transmit port and an external device Ethernet receiver port so that a router is not necessary for communication between the external device and the at least one internal device.

23. The method of claim 16, further comprising:
sending only one message at a time thereby substantially eliminating collisions.

24. The method of claim 17, further comprising:
transmitting N bytes between the processor and the at least one internal device over N different busses.

25. The method of claim 21, further comprising:
setting communication protocol checksums for the at least one internal device to zero to alleviate the burden of calculating the checksums on the at least one internal device; and
adding a checksum to the end of a packet.

26. The method of claim 18, further comprising:
providing in the web server all software resident in the downhole tool; and
accessing the downhole tool via a browser that provides an interface to the downhole tool and alleviates software compatibility issues.

27. The method of claim 15, further comprising:
transmitting and receiving e-mails in an e-mail server in the processor.

28. The method of claim 27, further comprising:
broadcasting at least one technical e-mail alert via the e-mail server so that only downhole tools with a particular address receive the at least one technical e-mail alert when attached to a network.

* * * * *